(12) United States Patent
Hu et al.

(10) Patent No.: US 8,213,320 B2
(45) Date of Patent: Jul. 3, 2012

(54) METHOD AND SWITCHING DEVICE FOR STACK PORT CONFIGURATION

(75) Inventors: Xiaolong Hu, Beijing (CN); Yong Wang, Beijing (CN)

(73) Assignee: Hewlett-Packard Development Company, L.P., Houston, TX (US)

(*) Notice: Subject to any disclaimer, the term of this patent is extended or adjusted under 35 U.S.C. 154(b) by 297 days.

(21) Appl. No.: 12/685,968

(22) Filed: Jan. 12, 2010

(65) Prior Publication Data
US 2010/0182933 A1 Jul. 22, 2010

(30) Foreign Application Priority Data
Jan. 19, 2009 (CN) .......................... 2009 1 0076759

(51) Int. Cl.
*G01R 31/08* (2006.01)
(52) U.S. Cl. ........................... 370/244; 370/254
(58) Field of Classification Search ........................ None
See application file for complete search history.

(56) References Cited

U.S. PATENT DOCUMENTS

| | | | | |
|---|---|---|---|---|
| 7,120,683 B2 * | 10/2006 | Huang | ........................... | 709/223 |
| 7,466,653 B1 * | 12/2008 | Cohen et al. | ................... | 370/235 |
| 7,483,383 B2 * | 1/2009 | Santoso et al. | ................ | 370/244 |
| 7,570,607 B2 * | 8/2009 | Andersen et al. | ............. | 370/261 |
| 2010/0182933 A1 * | 7/2010 | Hu et al. | ........................ | 370/254 |
| 2010/0329111 A1 * | 12/2010 | Wan et al. | ...................... | 370/218 |

* cited by examiner

*Primary Examiner* — Robert Wilson

(57) ABSTRACT

The invention provides a method and switching device for configuring stack ports. A switching device in a stacking system searches in the neighbor information table to determine whether the neighbor ID carried in a stack link negotiation packet is contained in the table after it receives the stack link negotiation packet on one of its physical ports that is enabled with the stacking function. If the neighbor ID is contained in the table, the switching device adds the physical port to the stack port corresponding to the neighbor ID in the neighbor information table; if it is not contained in the table, the switching device creates a stack port not in use, creates a binding between the neighbor ID and the stack port, and adds the physical port to the stack port. The present invention can automatically configure stack ports, greatly reducing the configuration work of administrators, and avoiding stacking device faults caused by manual configuration errors at the same time.

33 Claims, 3 Drawing Sheets

METHOD AND SWITCHING DEVICE FOR STACK PORT CONFIGURATION

CROSS-REFERENCE TO RELATED APPLICATIONS

This application claims the benefit under 35 U.S.C. §119 (a)-(d) of Chinese Application 200910076759.7 filed on Jan. 19, 2009.

TECHNICAL FIELD

This invention relates in general to the field of network communications and more particularly to a method and switching device for stack port configuration.

BACKGROUND OF THE INVENTION

To improve the availability and expandability of devices and simplify device management, stacking technology has been developed and applied. Stacking technology connects two or more distributed switching devices to form a logical device, and users can manage the entire stack through the logical device. The switching devices in a stack are connected by stack links. A stack link can be one physical link or aggregated from multiple physical links. Stack management packets, data forwarding packets and high availability backup packets are transmitted over stack links. In application, stack aggregate links are adopted to improve the bandwidth and availability of the switching devices. In this case, physical ports connecting to the same neighbor need to be configured as a stack port. This stack port is a logical port aggregated from multiple physical ports.

Currently, stack ports are manually configured. A physical port enabled with the stacking function is manually added to a stack port according to the connection status of the stack links between switching devices. This manual stack port configuration method increases the configuration work load of administrators and increases the possibility of configuration errors when there are many physical ports. An example of incorrectly configured physical ports and stack ports associated with a stack configuration is shown in FIG. 1. In the example, physical port 1 on switching device 2 is a common service port not enabled with the stacking function, but the administrator adds the physical port to stack port 1; also, a stack link exists between physical port 3 on switching device 2 and switching device 1, and the physical port should be added to stack port 1, but the administrator adds the physical port to stack port 2 connecting to switching device 3. These wrong configurations may cause stack establishment failure, device failure or stack loop, cause the stack unable to operate normally.

SUMMARY OF THE INVENTION

This invention provides a method and switching device for configuring stack ports, thus to reduce the configuration work load of administrators and avoid abnormal operation of a stack due to manual configuration errors.

A switching device in a stacking system receives a stack link negotiation packet on one of its physical ports that is enabled with the stacking function, and thereafter searches in a neighbor information table to determine whether the neighbor ID carried in the stack link negotiation packet is contained in the table. If it is, then the switching device adds the physical port to a stack port in a stack port information table in the switching device, wherein the stack port corresponds to the neighbor ID in the neighbor information table; if it is not, then the switching device creates a stack port not in use, creates a binding between the neighbor and the created stack port, and adds the physical port to the stack port in the stack port information table.

A switching device, which is applied in a stacking system, comprises an ID query unit, a first port configuration unit, a second port configuration unit and a device information table storage unit.

The ID query unit is used for querying whether a neighbor ID carried in a stack link negotiation packet is contained in a neighbor information table, after the switching device receives the stack link negotiation packet on a physical port enabled with the stacking function. If the neighbor ID is in the neighbor information table, the switching device sends the neighbor ID to the first port configuration unit; otherwise, it sends the neighbor ID to the second port configuration unit.

The first port configuration unit is used for adding the physical port on which the packet was received to the stack port corresponding to the neighbor ID in the neighbor information table after receiving the neighbor ID.

The second port configuration unit is used for creating a stack port not in use after receiving the neighbor ID, creating a binding between the neighbor ID and the created stack port in the neighbor information table, and adding the physical port to the stack port.

The device information table storage unit is used for saving the neighbor information table.

The preceding technology scheme shows that after a switching device in a stacking system receives a stack link negotiation packet on one of its physical ports that is enabled with the stacking function, it searches in the neighbor information table to determine whether the neighbor ID carried in the stack link negotiation packet is contained in the table. If it is, the switching device adds the physical port to the stack port corresponding to the neighbor ID in the neighbor information table; if it is not, the switching device creates a stack port not in use, creates a binding between the neighbor ID and the stack port, and adds the physical port to the stack port. According to the stack link negotiation packets exchanged between switching devices and the connection relations between physical ports and neighbor devices, the present invention can determine the stack ports to which the physical ports belong and automatically configure stack ports, greatly reducing the configuration work load of administrators, and, at the same time, avoiding stacking device failure caused by manual configuration errors.

DESCRIPTION ON THE DRAWINGS

Figure 3A:
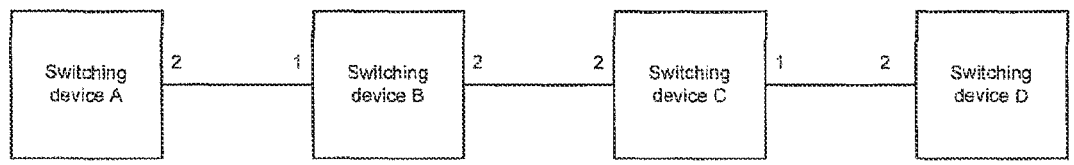

FIG. 3*a* is a schematic diagram illustrating stack port collision according to an embodiment of the present invention.

Figure 3B:
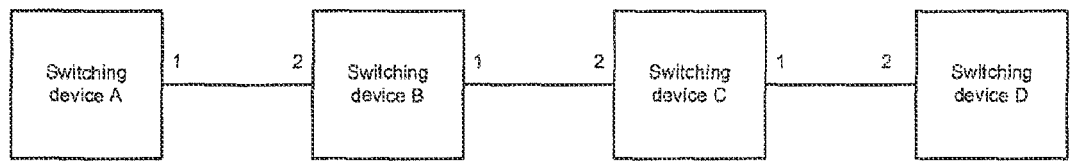

FIG. 3*b* is a schematic diagram illustrating collision resolution.

Figure 4A:
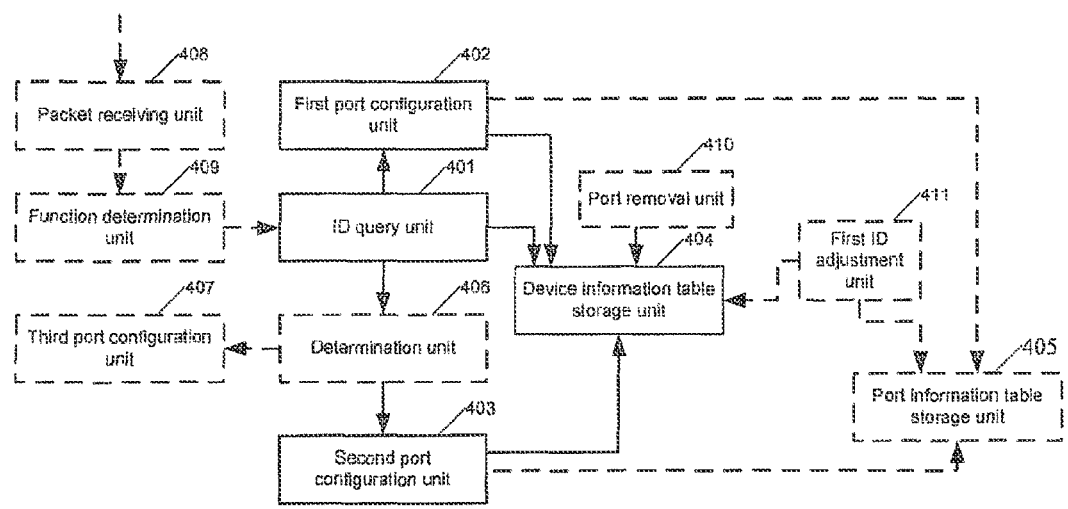

FIG. 4*a* is a schematic diagram illustrating an architecture of the switching device according to an embodiment of the present invention.

Figure 4B:
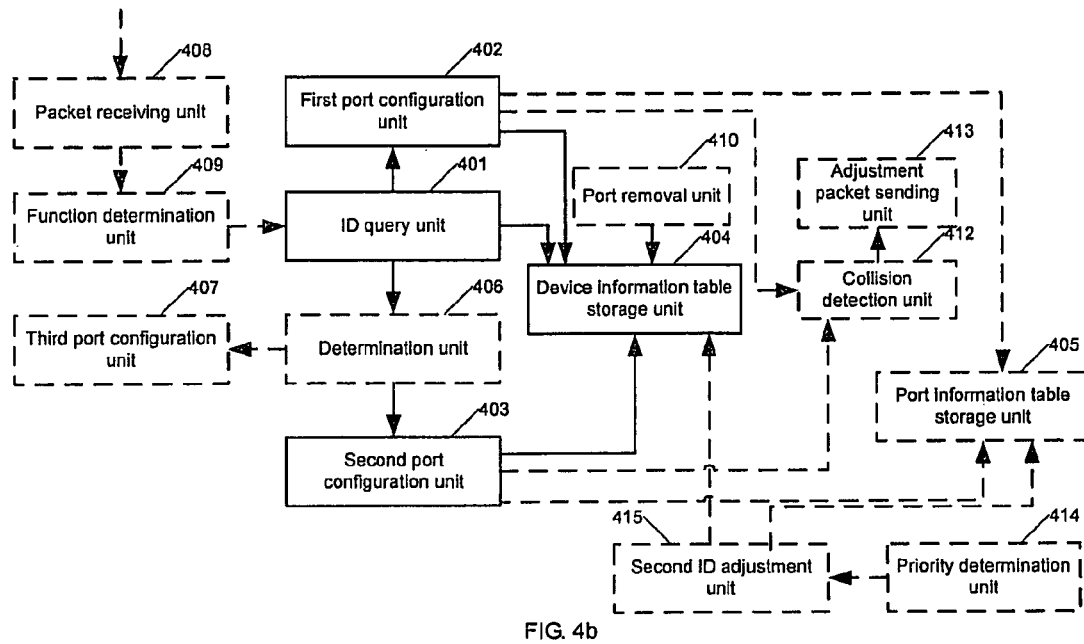

FIG. 4*b* is a schematic diagram illustrating another architecture of the switching device according to an embodiment of the present invention.

Figure 5:
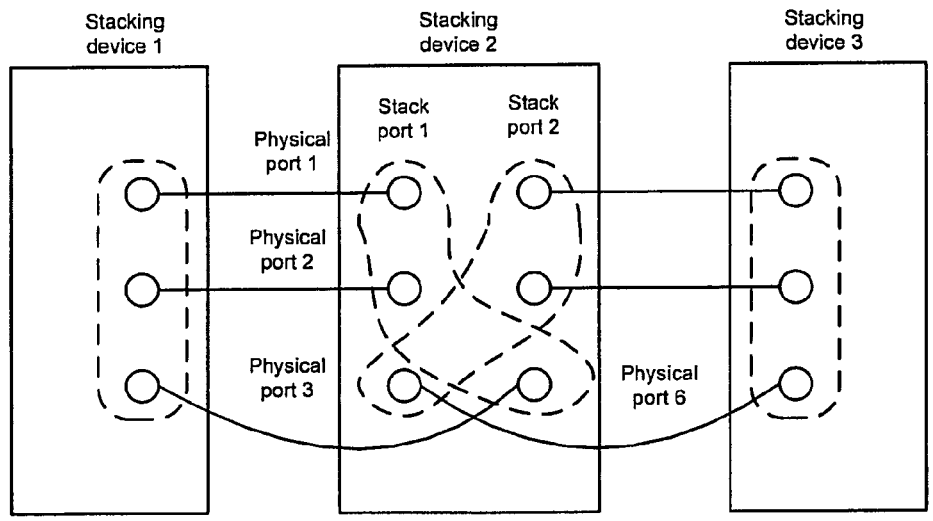

FIG. 5 is a schematic diagram illustrating the architecture after the method provided by this invention is adopted.

DETAILED DESCRIPTION OF THE EMBODIMENTS

To clarify the aims, technical proposals, and advantages of the present invention, the present invention is described below in conjunction with the figures and embodiments.

This invention provides a method, comprising: a switching device searching in a neighbor information table to determine whether a neighbor ID carried in a Stack Negotiate Hello (SN-Hello) packet is contained in the table, after the switching device receives the SN-Hello packet on one of its physical ports that is enabled with a stacking function. If the neighbor ID is contained in the table, the switching device adds the physical port to the stack port corresponding to the neighbor ID in the neighbor information table. If the neighbor ID is not contained in the table, the switching device creates a stack port not in use, creates a binding between the neighbor ID and the stack port, and adds the physical port to the stack port.

Figure 2:
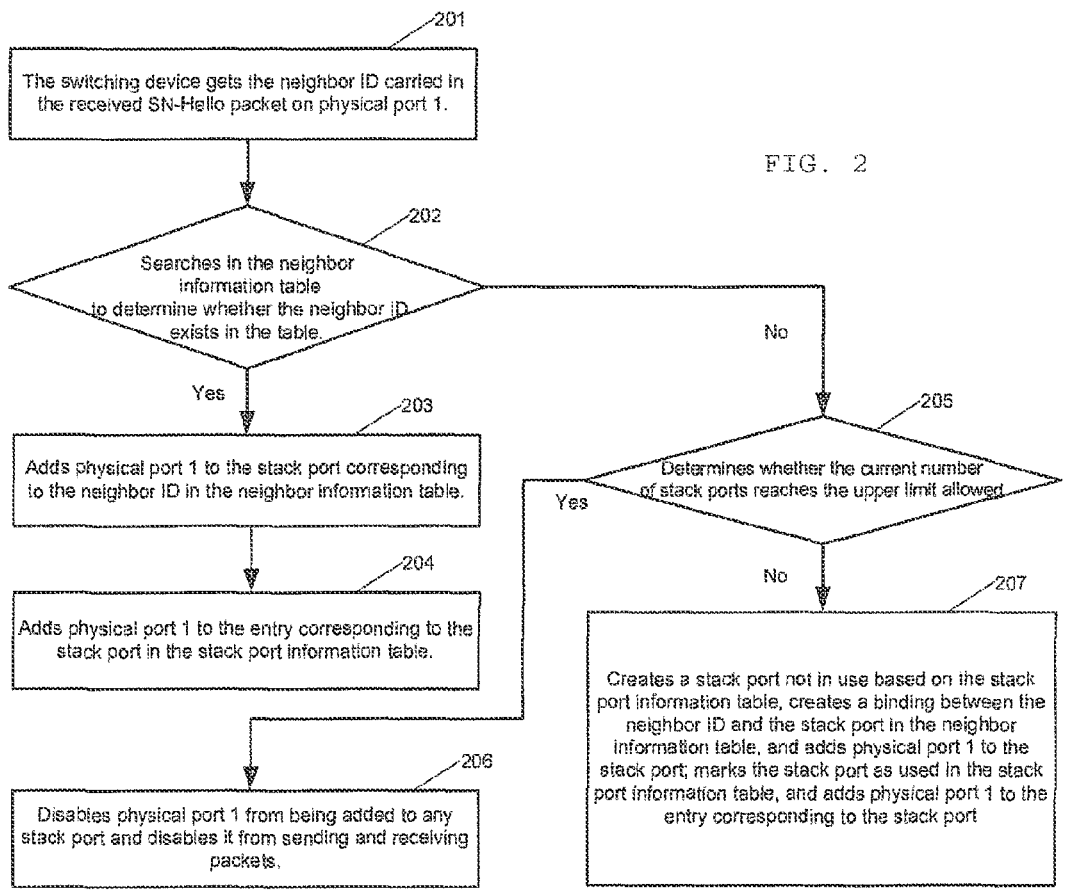
FIG. 2 illustrates a flow chart of the method provided by the present invention.

Further, in the following description of embodiments of the present invention, specific details are provided for a complete understanding of the embodiments of the invention. FIG. 2 illustrates a flow chart of the method provided by this invention, comprising the following steps:

At step 201: When the switching device receives an SN-Hello packet on (by way of example) physical port 1, it gets the neighbor ID carried in the packet.

When the stack link of a physical port on a switching device in a stack is connected, that is, when the physical port is in the up state and enabled with the stacking function, the switching device sends an SN-Hello packet through the physical port; or the switching device sends a response to a neighbor device after receiving the SN-Hello packet sent from the neighbor device on the physical port if the physical port is enabled with the stacking function. The SN-Hello packet carries ID information of the switching device that sends the SN-Hello packet, for example the bridge MAC address information of the switching device.

If the switching device receives an SN-Hello packet on a physical port not enabled with the stacking function, it discards the packet, or enables the stacking function of the physical port to correct the stack configuration.

At step 202: The switching device searches the neighbor information table to check if the neighbor ID exists in the table. If the neighbor ID does exist in the table, the switching device executes step 203; otherwise, the switching device executes step 205.

Each switching device stores a neighbor information table in which the neighbor IDs of the neighbor devices and the information of the stack ports connecting the neighbors are saved. Taking FIG. 1 as an example, the neighbor information table in switching device 2 is as shown in Table 1.

TABLE 1

| Neighbor ID | Stack port |
|---|---|
| Switching device 1 | Stack port 1 |
| Switching device 3 | Stack port 2 |

At step 203: The switching device adds physical port 1 to the stack port corresponding to the neighbor ID in the neighbor information table.

If the stack port corresponding to the neighbor device exists in a stack port information table stored in the switching device, configure physical port 1 as a member of the stack port (as described in step 204).

At step 204: In the stack port information table, the switching device adds physical port 1 to the entry corresponding to the stack port to complete this branch of the process.

A stack port information table can be stored in each switching device. The stack port information table contains stack port IDs, an indication of whether the stack ports are in use, and information of the physical ports in the stack ports. Taking FIG. 1 as an example, the stack port information table in switching device 2 is as shown in Table 2.

TABLE 2

| Stack port ID | Whether in use | Member port |
|---|---|---|
| Stack port 1 | Used | Physical port 1 |
| | | Physical port 2 |
| | | Physical port 3 |
| | | ... |
| Stack port 2 | Unused | |

At step 205: The switching device checks whether the current number of stack ports has reached an allowed upper limit. If the upper limit has been reached, the switching device executes step 206; otherwise, the switching device executes step 207.

At step 206: The device disables physical port 1 from being added to any stack port, and disables the physical port from sending and receiving packets to complete this branch of the process.

If the current number of stack ports has reached the upper limit, the connection between the neighbor device and physical port 1 is an illegal connection, which may result in stack loop. Therefore, above steps taken ensure that this will not result in stack device failure or other network problems.

A step 207: The switching device creates a stack port not in use based on the stack port information table, creates a binding between the neighbor ID and the stack port in the neighbor information table, adds physical port 1 to the stack port. The switching device then marks the stack port as used in the stack port information table, and adds physical port 1 to the entry corresponding to the stack port to complete the process.

More specifically, since on this branch (from step 203), the neighbor ID is not in the neighbor information table, there is no stack port corresponding to the neighbor device configured on the switching device. So the switching device finds a stack port ID not in use in the stack port information table, creates a stack port and assigns the port the stack port ID, marks the stack port as used, and adds physical port 1 to the stack port. Thereafter, it creates a binding between the neighbor ID and the stack port in the neighbor information table for later use.

If the stack link on a physical port is disconnected, that is, the physical port is in the down state, the switching device removes the physical port from the stack port to which it belongs, meaning removing it from the stack port information table. If there are no other physical ports in the stack port, the switching device marks the stack port as unused, and removes the entry corresponding to the stack port in the neighbor information table.

If the switching devices in a stack are required to be connected in a daisy chain configuration, that is, the stack ports of each switching device are connected in a fixed way, for example, stack port 1 of the switching device must be connected to stack port 2 of a neighbor device, the following two methods can be used:

Method 1: If there are only two switching devices in the stack, or several switching devices start up in turn, the SN-Hello packet can further carry the stack port ID for sending the SN-Hello packet. When the switching device receives the SN-Hello packet on physical port 1, it changes the ID of the stack port to which physical port 1 is added to a different stack port ID from that carried in the SN-Hello packet. For example, switching device 2 receives the SN-Hello packet sent by switching device 1 on its physical port 1. The SN-Hello packet carries the ID of switching device 1, and also the stack port ID for sending the SN-Hello packet by switching device 1. If stack port 1 is used, switching device 2 changes the ID of the stack port to which physical port 1 is added to stack port 2 so that it can be used in a daisy chain connection.

Method 2: After adding a physical port to a stack port, each switching device checks whether the stack port conflicts with the stack port connecting to the neighbor device. If their IDs are the same, the switching device and the neighbor device send ID adjustment packets through their respective physical port connecting them. The ID adjustment packet contains the ID of the switching device and the ID of the stack port to which the physical port that sends the ID adjustment packet belongs. When the switching device receives an ID adjustment packet from another switching device, it checks whether its own priority is smaller than the priority of the switching device that sends the ID adjustment packet according to the switching device ID information carried in the ID adjustment packet; if its priority is smaller, it stops sending the ID adjustment packet that carries its ID information, and changes its stack port ID according to the stack port ID carried in the received ID adjustment packet. More specifically, the switching device changes the ID of the stack port to which the physical port that receives the ID adjustment packet belongs to a different stack port ID from that carried in the ID adjustment packet, and changes the IDs of other stack ports. Otherwise, the switching device discards the received ID adjustment packet.

As illustrated in FIG. 3a, suppose switching device C configures the physical port connecting switching device B as stack port 2 following the process shown in FIG. 2. It then detects that stack port 2 conflicts with the stack port connecting switching device B, that is, the IDs of the stack ports connecting switching device B and switching device C are both stack port 2. The details of this collision detection method are as follows. Switching device C and switching device B both send an ID query packet that carries their own stack port IDs, or carry their own stack port IDs in the SN-Hello packet illustrated in FIG. 2. After a collision is detected, switching device B sends to switching device C through stack port 2 an ID adjustment packet that carries the device ID and ID of stack port 2 of switching device B, and switching device C sends to switching device B through stack port 2 an ID adjustment packet that carries the device ID and ID of stack port 2 of switching device C. Suppose a smaller device ID represents a higher priority. In this stack, the ID of switching device C is the smallest, so its priority is the highest. When switching device B receives the ID adjustment packet from switching device C, it determines that its priority is smaller than that of switching device C. Therefore, switching device B stops sending the ID adjustment packet that carries its device ID, changes stack port 2 that receives the ID adjustment packet to stack port 1 according to the ID of stack port 2 carried in the ID adjustment packet, and changes stack port 1 of switching device B to stack port 2 and forwards the ID adjustment packet to switching device A. When switching device C receives the ID adjustment packet from switching device B, it determines that its priority is higher than that of switching device B, so it discards the ID adjustment packet. Other switching devices follow the same operations. Their stack port IDs are adjusted according to the ID adjustment packet sent by switching device C to satisfy the requirement of a daisy chain connection. The result is as illustrated in FIG. 3b.

The above is the detailed description of the method provided by the present invention. The following is the detailed description of the switching device provided by this invention. As illustrated in FIG. 4a and FIG. 4b, the switching device comprises an ID query unit 401, a first port configuration unit 402, a second port configuration unit 403, and a device information table storage unit 404.

ID query unit 401 is used for querying whether the neighbor ID carried in the stack link negotiation packet is contained in the neighbor information table after the switching device receives the stack link negotiation packet on the physical port enabled with the stacking function. If the neighbor ID is in the neighbor information table, the switching device sends the neighbor ID to first port configuration unit 402; otherwise, it sends the neighbor ID to second port configuration unit 403.

First port configuration unit 402 is used for adding the physical port to the stack port corresponding to the neighbor ID in the neighbor information table after it receives the neighbor ID.

Second port configuration unit 403 is used for creating a stack port that is not used by the switching device, creating a binding between the neighbor ID and the stack port in the neighbor information table, and adding the physical port to the stack port after receiving the neighbor ID.

Device information table storage unit 404 is used for saving the neighbor information table.

The switching device further comprises port information table storage unit 405, which is used for saving the stack port information table.

First port configuration unit 402 further functions to add the physical port to the entry corresponding to the stack port in the stack port information table when adding the physical port to the stack port corresponding to the neighbor ID in the neighbor information table.

Second port configuration unit 403 further functions to mark the stack port as used in the stack port information table, and add the physical port to the entry corresponding to the stack port when adding the physical port to the stack port.

The switching device further comprises a determination unit 406 and a third port configuration unit 407.

Determination unit 406, which can be set between the ID query unit and second port configuration unit, is used for receiving the neighbor ID sent by the ID query unit 401, and determining whether the number of stack ports used by the switching device has reached the upper limit allowed. If the upper limit has been reached, the determination unit sends an execution notification to third port configuration unit 407; otherwise, it sends the neighbor ID to second port configuration unit 403.

Third port configuration unit 407 is used for disabling the physical port from being added to any stack port, and disabling the physical port from sending and receiving packets after receiving the execution notification.

The switching device further comprises a packet receiving unit 408 and a function determination unit 409.

Packet receiving unit 408 is used for receiving link negotiation packets on a physical port.

Function determination unit 409 is used for checking whether the physical port is enabled with the stacking function. If the physical port is enabled, it sends the link negotiation packet to ID query unit 401; otherwise, it discards the link negotiation packet or enables the stacking function of the physical port.

The switching device further comprises port removal unit 410, which is used for removing the physical port from the stack port to which the physical port is added when the stack link that the port is connected to is disconnected, and marking the stack port as unused and removing the entry corresponding to the stack port in the neighbor information table when there is no other physical port in the stack port.

Preferably, the switching device further comprises a port ID adjustment function when the stack port IDs in a stacking system need to meet the requirement of a daisy chain connection. In this case, the link negotiation packet carries the stack port ID for sending the negotiation packet. The switching device further comprises first ID adjustment unit 411, which is used for getting the stack port ID carried in the link negotiation packet, and changing the ID of the stack port to which the physical port is added to an ID different from the stack port ID carried in the link negotiation packet.

First ID adjustment unit 411 needs to adjust the ID of this stack port in both the neighbor information table and stack port information table.

The switching device with the port ID adjustment function has another architecture, as illustrated in FIG. 4b, in which the switching device further comprises a collision detection unit 412, an adjustment packet sending unit 413, a priority determination unit 414, and a second ID adjustment unit 415.

Collision detection unit 412 is used for checking whether the stack port that first port configuration unit 402 or second port configuration unit 403 adds the physical port to conflicts with the stack port on the device to which the physical port is connected.

Adjustment packet sending unit 413 is used for sending an ID adjustment packet that carries the switching device ID and the stack port ID to which the physical port is added from the physical port when conflict is detected by collision detection unit 412.

Priority determination unit 414 is used for determining whether the priority of the switching device where it resides is smaller than that of the switching device that sends the ID adjustment packet according to the switching device ID carried in the ID adjustment packet after the switching device receives the ID adjustment packet on the physical port; if the priority is smaller, it sends an adjustment notification to second ID adjustment unit 415; otherwise, it discards the received ID adjustment packet.

Second ID adjustment unit 415 is used for disabling adjustment packet sending unit 413 from sending the ID adjustment packet, adjusting the ID of the stack port to which the physical port is added according to the stack port ID carried in the ID adjustment packet received, and forwarding the received ID adjustment packet.

Collision detection unit 412 checks whether the stack port to which the physical port is added conflicts with the stack port on the neighbor device to which the physical port is connected. Details of collision detection are as follows. The switching device and neighbor device send a detection packet that carries the stack port ID through their respective stack port. If collision detection unit 412 determines that the ID of the stack port that receives the packet is the same as that carried in the collision detection packet, a collision is determined to have occurred. Alternatively or additionally, if the link negotiation packet carries the stack port ID used by the packet, collision detection unit 412 determines whether the ID of the stack port to which the physical port is added conflicts with the stack port ID carried in the link negotiation packet. If there is a conflict, a collision is determined to have occurred.

The method and switching device provided by this invention feature the following advantages:

1) After a switching device in a stacking system receives a stack link negotiation packet on one of its physical ports that is enabled with the stacking function, it searches in the neighbor information table to determine whether the neighbor ID carried in the stack link negotiation packet is contained in the table. If it is, the switching device adds the physical port to the stack port corresponding to the neighbor ID in the neighbor information table; if it is not, the switching device creates a stack port not in use, creates a binding between the neighbor ID and the created stack port, and adds the physical port to the stack port. The present invention uses stack link negotiation packets sent between switching devices to determine the stack port to which a physical port belongs according to the connection between each physical port and its neighbor device, thus automatically configuring stack ports, greatly reducing the configuration work of administrators, and avoiding stacking device failure caused by manual configuration errors at the same time.

Figure 1:
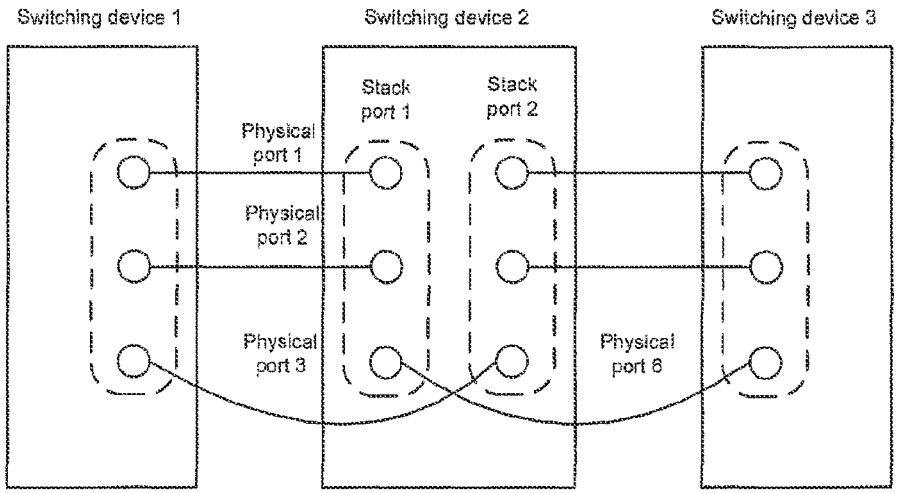
FIG. 1 is a schematic diagram illustrating stack port configuration errors.

2) The problem of stack configuration inconsistency of physical ports is solved. As shown in FIG. 1, physical port 1 on switching device 2 is not enabled with the stacking function. When switching device 2 receives a link negotiation packet on physical port 1 with this invention, it discards the link negotiation packet, and physical port 1 will not be added to any stack port and will not send link negotiation packets because the stacking function is not enabled on the physical port, thus avoiding device failure or stack loop. Or, when switching device 2 receives a link negotiation packet on physical port 1 with this invention, it automatically enables the stacking function on the port, and adds the physical port to the corresponding stack port, thus to solving the problem of stack configuration inconsistency.

After the method provided by this invention is used, the connection type shown in FIG. 1 becomes what is shown in FIG. 5.

Although an embodiment of the invention and its advantages are described in detail, a person skilled in the art could make various alternations, additions, and omissions without departing from the spirit and scope of the present invention as defined by the appended claims.

The invention claimed is:

1. A method of port configuration comprising:
at a first switching device, receiving a stack link negotiation packet on a first physical port that is enabled with a stacking function, the stack link negotiation packet being received from a second switching device that is communicatively coupled with the first switching device by way of the first physical port on the first switching device;
determining whether a neighbor ID carried in the stack link negotiation packet is contained in a neighbor information table that is stored at the first switching device;
if the neighbor ID is contained in the neighbor information table, determining from the neighbor information table a particular logical stack port associated with the neighbor ID, and adding the first physical port to the particular logical stack port in a stack port information table; and
if the neighbor ID is not contained in the neighbor information table, creating the particular logical stack port, creating a logical binding between the neighbor ID and the particular logical stack port and thereafter adding the first physical port to the particular logical stack port in the stack port information table.

2. The method of claim 1, wherein determining whether the neighbor ID carried in the stack link negotiation packet is contained in the neighbor information table comprises searching the neighbor information table for the neighbor ID.

3. The method of claim 1, wherein the particular logical stack port corresponds to an entry in the stack port information table stored at the first switching device, and wherein adding the first physical port to the particular logical stack port comprises adding an identifier of the first physical port to the entry in the stack port information table.

4. The method of claim 1, wherein creating the particular logical stack port comprises:
  determining a stack port ID associated with a logical stack port that is not in use in the stack port information table stored at the switching device;
  creating a new entry in the stack port information table corresponding to the particular logical stack port, and
  associating the particular logical stack port with the stack port ID; and marking the particular logical stack port as in use in the stack port information table.

5. The method of claim 4, wherein creating the logical binding between the neighbor ID and the particular logical stack port comprises:
  creating a new association between the neighbor ID and the particular logical stack port; and
  adding the new association to the neighbor information table, and wherein thereafter adding the first physical port to the particular logical stack port comprises adding an identifier of the first physical port to the new entry in the stack port information table.

6. The method of claim 1, wherein creating the particular logical stack port comprises:
  creating the particular logical stack port if a number of logical stack ports used by the first switching device has not reached a maximum allowed number.

7. The method of claim 6, further comprising:
  if the number of logical stack ports used by the first switching device has reached the maximum allowed number, not creating the particular logical stack port, disabling the first physical port from being added to any logical stack port of the first switching device, and disabling the first physical port from sending and receiving any packets.

8. The method of claim 1, further comprising:
  at the first switching device, receiving a given stack link negotiation packet on a given physical port that is not enabled with the stacking function; and
  responsively taking an action, the action being selected from the group consisting of enabling the stacking function on the given physical port, and discarding the given stack link negotiation packet.

9. The method of claim 1, wherein the particular logical stack port corresponds to an entry in the stack port information table stored at the first switching device,
  and wherein the method further comprises:
  subsequent to adding the first physical port to the particular logical stack port, making a determination that the first physical port is in down state;
  responsive to the determination, removing the first physical port from the particular logical stack port; and
  if there are no other physical ports in the particular logical stack port after removing the first physical port, marking the particular logical stack port as unused in the stack port information table, and removing the particular logical stack port from the neighbor information table.

10. The method of claim 1, wherein the neighbor ID carried in the stack link negotiation packet corresponds to the second switching device and the stack link negotiation message further carries a stack port ID associated with a remote logical stack port on the second switching device, the stack link negotiation packet having been received from the second switching device by way of the remote logical stack port,
  wherein the particular logical stack port corresponds to an entry in the stack port information table stored at the first switching device,
  and wherein the method further comprises:
  changing a stack port ID associated with the particular logical stack port in the stack port information table to be different from the stack port ID associated with the remote logical stack port.

11. The method of claim 1, wherein the particular logical stack port corresponds to an entry in the stack port information table stored at the first switching device,
  and wherein the method further comprises:
  subsequent to adding the first physical port to the particular logical stack port, making a determination that the particular logical stack port conflicts with a remote logical stack port on the second switching device; and
  responsive to the determination, sending from the first physical port to the second switching device a first-device stack port ID adjustment packet that carries both a device ID corresponding to the first switching device and a stack port ID associated with the particular logical stack port in the stack port information table.

12. The method of claim 11, further comprising:
  receiving on the first physical port a second-device stack port ID adjustment packet that carries both a device ID corresponding to the second switching device and a stack port ID associated with the remote logical stack port;
  determining from the second-device stack port ID adjustment packet a priority of the second switching device;
  if a priority of the first switching device is lower than the priority of the second switching device, changing the stack port ID associated with the particular logical stack port in the stack port information table to be different from the stack port ID associated with the remote logical stack port; and
  if the priority of the first switching device is not lower than the priority of the second switching device, discarding the second-device stack port ID adjustment packet.

13. The method of 12, further comprising:
  if the priority of the first switching device is lower than the priority of the second switching device, forwarding the second-device stack port ID adjustment packet to a third switching device.

14. The method of 11, wherein making the determination that the particular logical stack port conflicts with the remote logical stack port on the second switching device comprises:
  receiving on the first physical port a stack port ID query packet from the second switching device, the stack port ID query packet including both a device ID corresponding to the second switching device and a stack port ID associated with the remote logical stack port; and
  determining that the stack port ID associated with the remote logical stack port is the same as the stack port ID associated with the particular logical stack port in the stack port information table.

15. The method of 11, wherein the stack link negotiation packet further carries a stack port ID associated with the remote logical stack port on the second switching device, the stack link negotiation packet having been received from the second switching device by way of the remote logical stack port, and wherein making the determination that the particular logical stack port conflicts with the remote logical stack port on the second switching device comprises:

determining that the stack port ID associated with a remote logical stack port is the same as the stack port ID associated with the particular logical stack port in the stack port information table.

16. A first switching device comprising:

a first physical port configured to be communicatively connected with a second switching device;

a packet receiving unit configured to receive a stack link negotiation packet from the first physical port, wherein the stack link negotiation packet is received on the first physical port from the second switching device, and wherein the first physical port is enabled with a stacking function; and a device information table storage unit configured to store a neighbor information table, wherein the first switching device is configured to carry out the functions of:

determining whether a neighbor ID carried in the stack link negotiation packet is contained in the neighbor information table, if the neighbor ID is contained in the neighbor information table, determining from the neighbor information table a particular logical stack port associated with the neighbor ID, and adding the first physical port to the particular logical stack port in a stack port information table, and if the neighbor ID is not contained in the neighbor information table, creating the particular logical stack port, creating a logical binding between the neighbor ID and the particular logical stack port and thereafter adding the first physical port to the particular logical stack port in the stack port information table.

17. The first switching device of claim 16, further comprising a port information table storage unit configured to store the stack port information table, wherein the particular logical stack port corresponds to an entry in the stack port information table, and wherein adding the first physical port to the particular logical stack port comprises adding an identifier of the first physical port to the entry in the stack port information table.

18. The first switching device of claim 16, further comprising a port information table storage unit configured to store the stack port information table, and wherein creating the particular logical stack port comprises:

determining a stack port ID associated with a logical stack port that is not in use in the stack port information table;

creating a new entry in the stack port information table corresponding to the particular logical stack port, and associating the particular logical stack port with the stack port ID; and marking the particular logical stack port as in use in the stack port information table.

19. The first switching device of claim 18, wherein creating the logical binding between the neighbor ID and the particular logical stack port comprises:

creating a new association between the neighbor ID and the particular logical stack port; and adding the new association to the neighbor information table, and wherein thereafter adding the first physical port to the particular logical stack port comprises adding an identifier of the first physical port to the new entry in the stack port information table.

20. The first switching device of claim 16, wherein creating the particular logical stack port comprises:

creating the particular logical stack port if a number of logical stack ports used by the first switching device has not reached a maximum allowed number.

21. The first switching device of claim 20, wherein if the number of logical stack ports used by the first switching device has reached the maximum allowed number, not creating the particular logical stack port, disabling the first physical port from being added to any logical stack port of the first switching device, and disabling the first physical port from sending and receiving any packets.

22. The first switching device of claim 16, further comprising a given physical port that is not enabled with the stacking function, wherein the first switching device is further configured to carry out the functions of:

receiving a given stack link negotiation packet on the given physical port; and responsively taking an action, the action being selected from the group consisting of enabling the stacking function on the given physical port, and discarding the given stack link negotiation packet.

23. The first switching device of claim 16, further comprising a port information table storage unit configured to store the stack port information table, wherein the particular logical stack port corresponds to an entry in the stack port information table, and wherein the first switching device is further configured to carry out the functions of:

subsequent to adding the first physical port to the particular logical stack port, making a determination that the first physical port is in down state;

responsive to the determination, removing the first physical port from the particular logical stack port; and if there are no other physical ports in the particular logical stack port after removing the first physical port, marking the particular logical stack port as unused in the stack port information table, and removing the particular logical stack port from the neighbor information table.

24. The first switching device of claim 16, further comprising a port information table storage unit configured to store the stack port information table, wherein the particular logical stack port corresponds to an entry in the stack port information table, wherein the neighbor ID carried in the stack link negotiation packet corresponds to the second switching device, and the stack link negotiation message further carries a stack port ID associated with a remote logical stack port on the second switching device, and wherein the first switching device is further configured to carry out the function of:

changing a stack port ID associated with the particular logical stack port in the stack port information table to be different from the stack port ID associated with the remote logical stack port.

25. The first switching device of claim 16, further comprising a port information table storage unit configured to store the stack port information table, wherein the particular logical stack port corresponds to an entry in the stack port information table, and wherein the first switching device is further configured to carry out the functions of:

subsequent to adding the first physical port to the particular logical stack port, making a determination that the particular logical stack port conflicts with a remote logical stack port on the second switching device;
responsive to the determination, sending via the first physical port to the second switching device a first-device stack port ID adjustment packet that carries both a device ID corresponding to the first switching device and a stack port ID associated with the particular logical stack port in the stack port information table;
receiving via the first physical port a second-device stack port ID adjustment packet that carries both a device ID corresponding to the second switching device and a stack port ID associated with the remote logical stack port;
determining from the second-device stack port ID adjustment packet a priority of the second switching device;
if a priority of the first switching device is lower than the priority of the second switching device, changing the stack port ID associated with the particular logical stack port in the stack port information table to be different from the stack port ID associated with the remote logical stack port, and forwarding the second-device stack port ID adjustment packet to a third switching device; and
if the priority of the first switching device is not lower than the priority of the second switching device, discarding the second-device stack port ID adjustment packet.

26. A first switching device comprising:
a first physical port configured to be communicatively connected with a second switching device;
a packet receiving unit configured to receive a stack link negotiation packet from the first physical port, wherein the stack link negotiation packet is received on the first physical port from the second switching device;
a device information table storage unit configured to store a neighbor information table stored;
an ID query unit configured to receive the stack link negotiation packet relayed from the packet receiving unit, and to determine whether a neighbor ID carried in the stack link negotiation packet is contained in the neighbor information table;
a first port configuration unit configured to receive the neighbor ID sent from the ID query unit and to determine from the neighbor information table a particular logical stack port associated with the neighbor ID, and to add the first physical port to the particular logical stack port; and
a second port configuration unit configured to receive the neighbor ID relayed from the ID query unit and to create the particular logical stack port, create a logical binding between the neighbor ID and the particular logical stack port, and thereafter add the first physical port to the particular logical stack port,
wherein the ID query unit is further configured to send the neighbor ID to the first port configuration unit if the neighbor ID is contained in the neighbor information table, and to relay the neighbor ID to the second port configuration unit at least if the neighbor ID is not contained in the neighbor information table.

27. The first switching device of claim 26, further comprising a port information table storage unit configured to store a stack port information table,
wherein the particular logical stack port corresponds to an entry in the stack port information table,
wherein the first port configuration unit is configured to add the first physical port to the particular logical stack port by adding an identifier of the first physical port to the entry in the stack port information table,
and wherein the second port configuration unit is configured to create the particular logical stack port by:
determining a stack port ID associated with a logical stack port that is not in use in the stack port information table;
creating a new entry in the stack port information table corresponding to the particular logical stack port, and associating the particular logical stack port with the stack port ID; and
marking the particular logical stack port as in use in the stack port information table.

28. The first switching device of claim 27, wherein the second port configuration unit is configured to create the logical binding between the neighbor ID and the particular logical stack port, and thereafter add the first physical port to the particular logical stack port by:
creating a new association between the neighbor ID and the particular logical stack port; adding the new association to the neighbor information table; and
adding an identifier of the first physical port to the new entry in the stack port information table.

29. The first switching device of claim 26, further comprising:
a determination unit configured to:
responsive to receiving the neighbor ID from the ID query unit, determine whether a number of logical stack ports used by the first switching device has reached a maximum allowed number,
relay the neighbor ID from the ID query unit to the second port configuration unit if the determined number has not reached the maximum allowed number, and
prevent the neighbor ID from being relayed from the ID query unit to the second port configuration unit if the determined number has reached the maximum allowed number; and
a third port configuration unit configured to receive an execution notification from the determination unit, and to responsively disable the first physical port from being added to any logical stack port of the first switching device, and to prevent the first physical port from sending and receiving any packets,
wherein the ID query unit is configured to relay the neighbor ID to the second port configuration unit by way of the determination unit, and
wherein the determination unit is further configured to send the execution notification to the third port configuration unit if the determined number has reached the maximum allowed number.

30. The first switching device of claim 26, further comprising:
a function determination unit configured to:
receive the stack link negotiation packet from the packet receiving unit;
determine whether the first physical port is enabled for a stacking function;
relay the stack link negotiation packet to the ID query unit if the first physical port is enabled for the stacking function; and
if the first physical port is not enabled for the stacking function, take an action, the action being selected from the group consisting of enabling the stacking function on the first physical port, and discarding the stack link negotiation packet, wherein the packet receiving unit is further configured to relay the stack link negotiation packet to the ID query unit by way of the function determination unit.

31. The first switching device of claim 26, further comprising:
a port information table storage unit configured to store a stack port information table,
wherein the particular logical stack port corresponds to an entry in the stack port information table; and
a port removal unit configured to:
remove the first physical port from the particular logical port upon a determination that subsequent to being added to the particular logical port, the first physical port entered a down state,
and, if there are no other physical ports in the particular logical stack port after the first physical port is removed, mark the particular logical stack port as unused in the stack port information table, and remove the particular logical stack port from the neighbor information table.

32. The first switching device of claim 26, wherein the neighbor ID carried in the stack link negotiation packet corresponds to the second switching device, and the stack link negotiation message further carries a stack port ID associated with a remote logical stack port on the second switching device, and
wherein the first switching device further comprises:
a port information table storage unit configured to store a stack port information table,
wherein the particular logical stack port corresponds to an entry in the stack port information table; and
a first ID adjustment unit configured to change a stack port ID associated with the particular logical stack port in the stack port information table to be different from the stack port ID associated with the remote logical stack port.

33. The first switching device of claim 26, further comprising:
a port information table storage unit configured to store a stack port information table,
wherein the particular logical stack port corresponds to an entry in the stack port information table;
a collision detection unit configured to determine whether the particular logical stack port conflicts with a remote logical stack port on the second switching device;
an adjustment packet sending unit configured to send via the first physical port to the second switching device a first-device stack port ID adjustment packet that carries both a device ID corresponding to the first switching device and a stack port ID associated with the particular logical stack port in the stack port information table;
a second ID adjustment unit configured to determine whether to prevent the adjustment packet sending unit from sending the first-device stack port ID adjustment packet; and
a priority determination unit configured to:
receive via the first physical port a second-device stack port ID adjustment packet that carries both a device ID corresponding to the second switching device and a stack port ID associated with the remote logical stack port,
determine from the second-device stack port ID adjustment packet a priority of the second switching device,
determine whether a priority of the first switching device is lower than the priority of the second switching device,
if the priority of the first switching device is lower than the priority of the second switching device, relay the second-device stack port ID adjustment packet to the second ID adjustment unit, and
if the priority of the first switching device is not lower than the priority of the second switching device, discard the second-device stack port ID adjustment packet,
wherein the adjustment packet sending unit is further configured to be directed by the second ID adjustment unit not to send the first-device stack port ID adjustment packet, and
wherein the second ID adjustment unit is further configured to receive the second-device stack port ID adjustment packet relayed from the priority determination unit, and to responsively:
change the stack port ID associated with the particular logical stack port in the stack port information table to be different from the stack port ID associated with the remote logical stack port,
direct the adjustment packet sending unit not to send the first-device stack port ID adjustment packet, and
forward the second-device stack port ID adjustment packet to a third switching device.

* * * * *

UNITED STATES PATENT AND TRADEMARK OFFICE
CERTIFICATE OF CORRECTION

PATENT NO. : 8,213,320 B2
APPLICATION NO. : 12/685968
DATED : July 3, 2012
INVENTOR(S) : Xiaolong Hu and Yong Wang It is certified that error appears in the above-identified patent and that said Letters Patent is hereby corrected as shown below:

On the title page, item [73], the assignee for this application should be changed from "Hewlett-Packard Development Company, L.P." to "Hangzhou H3C, Technologies, Co., Ltd."

Signed and Sealed this
Fourth Day of September, 2012

David J. Kappos
*Director of the United States Patent and Trademark Office*

UNITED STATES PATENT AND TRADEMARK OFFICE
CERTIFICATE OF CORRECTION

PATENT NO. : 8,213,320 B2  
APPLICATION NO. : 12/685968  
DATED : July 3, 2012  
INVENTOR(S) : Xiaolong Hu et al.

Page 1 of 1

It is certified that error appears in the above-identified patent and that said Letters Patent is hereby corrected as shown below:

In column 1, line 60, delete "A" and insert -- In accordance with a stack port configuration method, a --, therefor.

In column 10, line 48, in Claim 13, after "method of" insert -- claim --.

In column 10, line 53, in Claim 14, after "method of" insert -- claim --.

In column 10, line 65, in Claim 15, after "method of" insert -- claim --.

Signed and Sealed this
Twenty-ninth Day of January, 2013

David J. Kappos
*Director of the United States Patent and Trademark Office*